US010679253B2

(12) United States Patent
He et al.

(10) Patent No.: US 10,679,253 B2
(45) Date of Patent: Jun. 9, 2020

(54) RIDE SHARE SIGNAGE AND METHODS OF USING THE SAME

(71) Applicants:David Quan He, Johns Creek, GA (US); Ming Jiang, Alpharetta, GA (US)

(72) Inventors: David Quan He, Johns Creek, GA (US); Ming Jiang, Alpharetta, GA (US)

(73) Assignees: David Quan He, Johns Creek, GA (US); Ming Jiang, Alpharetta, GA (US)

( * ) Notice: Subject to any disclaimer, the term of this patent is extended or adjusted under 35 U.S.C. 154(b) by 222 days.

(21) Appl. No.: 15/802,577

(22) Filed: Nov. 3, 2017

(65) Prior Publication Data

US 2019/0139091 A1 May 9, 2019

(51) Int. Cl.
*G06Q 30/02* (2012.01)
*H04N 21/431* (2011.01)
(Continued)

(52) U.S. Cl.
CPC ......... *G06Q 30/0265* (2013.01); *B60Q 1/503* (2013.01); *G06Q 30/0261* (2013.01);
(Continued)

(58) Field of Classification Search
CPC ........... G06Q 30/0261; G06Q 30/0265; G06Q 50/30; B60Q 1/503; H04N 21/4314; G09F 9/33; G09F 21/04
(Continued)

(56) References Cited

U.S. PATENT DOCUMENTS 7,449,998 B1 * 11/2008 Au ..................... B60Q 1/2611
340/468
9,536,271 B2 * 1/2017 Kalanick ............... G06Q 50/30
(Continued)

OTHER PUBLICATIONS

Life after Uber, Disruption Hub, Available at https://disruptionhub.com/life-after-uber/ Jun. 22, 2017 (Year: 2017).*
(Continued)

*Primary Examiner* — Kevin H Flynn
*Assistant Examiner* — Emmett K. Walsh
(74) *Attorney, Agent, or Firm* — Ming Jiang; MM IP Services LLC

(57) ABSTRACT

The present disclosure relates to a ride share signage device and method of using the ride share signage device. In certain embodiments, ride share signage device includes: a border display element for displaying initials of ride share companies, an LED dot-matrix display element for displaying one or more advertisements and rider welcome messages in different languages. Signage controller includes a display driver to manage displays, an input module and a processing element. The input module receives information about one or more riders through a ride request and the advertisements. The processing element includes a processor and a non-volatile memory storing computer executable instructions. When executed by the processor, the computer executable instructions cause the processor to receive ride request and advertisement messages, display rider welcome message in certain distance from rider's pick-up location, and display the advertisements before displaying rider welcome message and after the riders have been dropped off.

18 Claims, 7 Drawing Sheets

(51) Int. Cl.
  *B60Q 1/50* (2006.01)
  *G06Q 50/30* (2012.01)
  *G09F 9/33* (2006.01)
  *G09F 21/04* (2006.01)

(52) U.S. Cl.
  CPC ......... *G06Q 50/30* (2013.01); *H04N 21/4314* (2013.01); *G09F 9/33* (2013.01); *G09F 21/04* (2013.01)

(58) Field of Classification Search
  USPC .......................................................... 705/13
  See application file for complete search history.

(56) References Cited

U.S. PATENT DOCUMENTS

| | | | | |
|---|---|---|---|---|
| 2004/0036622 | A1* | 2/2004 | Dukach | G09F 21/04 340/691.6 |
| 2008/0028649 | A1* | 2/2008 | Van Ness | G09F 7/00 40/447 |
| 2014/0338237 | A1* | 11/2014 | Chu | G09F 9/30 40/452 |
| 2015/0371157 | A1* | 6/2015 | Jaffe | G06Q 10/025 |
| 2018/0322712 | A1* | 11/2018 | Salter | H04M 1/7253 |
| 2019/0139091 | A1* | 5/2019 | He | G06Q 30/0265 |

OTHER PUBLICATIONS

"The Austin Ride-Hail Chronicles: Game Over for RideAustin?", AustinStartups.com, Available at: https:///austinstartups.com/the-austin-ride-hail-chronicles-game-over-for-rideaustin-a14b003c1ac4, Jun. 15, 2017 (Year: 2017).*

* cited by examiner

RIDE SHARE SIGNAGE AND METHODS OF USING THE SAME

FIELD

The present disclosure generally relates to ride sharing services, and more particularly to a ride share signage device and methods of using the ride share signage device.

BACKGROUND

Ride sharing companies such as Uber and Lyft are becoming more and more popular nowadays. The drivers working in these companies usually use their own vehicles. Unlike a taxi having a top sign and painted in unique color and patterns, the vehicles for these ride sharing companies are hard to identify. In a busy area such as an airport, many riders may request rides at same time, and it is a challenge to identify the vehicles when they come at the same time. In the evening, identifying a vehicle becomes even more difficult. It is very hard to see the brand of vehicle and/or the license tags.

Therefore, an unaddressed need exists in the art to address the aforementioned deficiencies and inadequacies.

SUMMARY

In one aspect, the present disclosure relates to a ride share signage device. In certain embodiments, the ride share signage device includes: a border display element, a light emitting diode (LED) dot-matrix display element, and a signage controller. The border display element displays initials of ride share companies. The LED dot-matrix display element displays one or more advertisement messages and rider welcome messages in different languages. The signage controller includes a display driver to manage displays on the border display element and the LED dot-matrix display element, respectively. The signage controller also includes an input module and a processing element. The input module receives information about one or more riders through a ride request and the advertisement messages. The processing element includes a processor and a non-volatile memory storing computer executable instructions.

In certain embodiments, when executed by the processor, the computer executable instructions cause the processor to: turn on the ride share signage device when a driver starts a vehicle and display one or more advertisement messages, receive a rider's information through the ride request via the input module, instruct the display driver to display a border on the border display element and the advertisement messages on the LED dot-matrix display element, instruct the display driver to display the rider welcome message in a predetermined distance before the vehicle reaches a pick-up location, instruct the display driver to display the border on the border display element and the advertisement messages on the LED dot-matrix display element related to the ride share company after the riders have been picked-up, and instruct the display driver to display the advertisement messages after the riders have been dropped-off. The rider's information may include a name, a phone number, a ride share company, a pick-up location, and a drop-off location.

In certain embodiments, the border display element displays a letter "U" for Uber, or a letter "L" for Lyft. When the driver works for both ride share companies, the letter "U" and "L" are displayed alternatively and in distinct colors. The border display element includes a first border display portion for displaying the letter "L" when the first border display portion is turned on, and a second border display portion for displaying a second half of the letter "U" when the first border display portion and the second border display portion are both turned on, and the letter "U" and the letter "L" are in different colors.

In certain embodiments, the rider welcome message includes a short message designated by the rider, the driver, or both the rider and the driver. The short message includes one or more of: the rider's name, the rider's phone number, the driver's name, the driver's phone number, a driver's license tag, the pick-up location, and the drop-off location. Each of these short messages may be displayed in sequence and in different colors. In certain embodiments, the first name and the last name initial may be displayed for the rider and/or the driver for privacy reason. When the driver and/or the rider choose not to use their names, the short message may include a phrase designated by the driver and/or the rider. When one or more short messages are displayed in the LED dot-matrix display element and they don't fit on one screen, the one or more short messages may be displayed in multiple screens. The multiple screen short messages may be displayed in a rolling manner: rolling from left to right, from right to left, from bottom to top, and from top to bottom.

In certain embodiments, the input module includes a wireless input module and a USB input module. The wireless input module receives the ride request and the advertisement messages through a local network over a mobile communication device. The USB input module receives the advertisement messages through a USB storage device. The local network may include a Wi-Fi network and a Bluetooth network. The mobile communication device includes an internet enabled portable computing device and a smartphone.

In certain embodiments, the ride share signage device is mounted on a dashboard of the vehicle. The ride share signage device may be attached to the dashboard of the vehicle using Velcro strips and/or a bracket at the bottom of the ride share signage device, and/or the ride share signage device may be attached to a windshield of the vehicle using one or more suction mounts. In one embodiment, the ride share signage device may be powered by electric power outlets in the vehicle. In another embodiment, the ride share signage device may be powered by battery and/or rechargeable battery.

In another aspect, the present disclosure relates to a method of using a ride share signage device. In certain embodiments, the method includes: mounting, by a driver of a vehicle, the ride share signage device on a dashboard of the vehicle, turning on the ride share signage device when the driver starts the vehicle and provides electrical power to the ride share signage device to display one or more advertisement messages, and receiving, by the ride share signage device, a rider's information via an input module of a signage controller, when the driver's mobile communication device accepts and receives a ride request. The rider's information may include a name, a phone number, a ride share company, a pick-up location, and a drop-off location. The method also includes: displaying a border on a border display element and the advertisement messages on a light emitting diode (LED) dot-matrix display element related to the ride share company, displaying a rider welcome message in a predetermined distance before the vehicle reaches the pick-up location, displaying the border on the border display element and the advertisement messages on the LED dot-matrix display element related to the ride share company after the riders have been picked-up, and displaying the advertisement messages after the riders have been dropped-off.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment. The drawings do not limit the present disclosure to the specific embodiments disclosed and described herein. The drawings are not necessarily to scale, emphasis instead being placed upon clearly illustrating the principles of the disclosure, and wherein.

DETAILED DESCRIPTION

Figure 1:
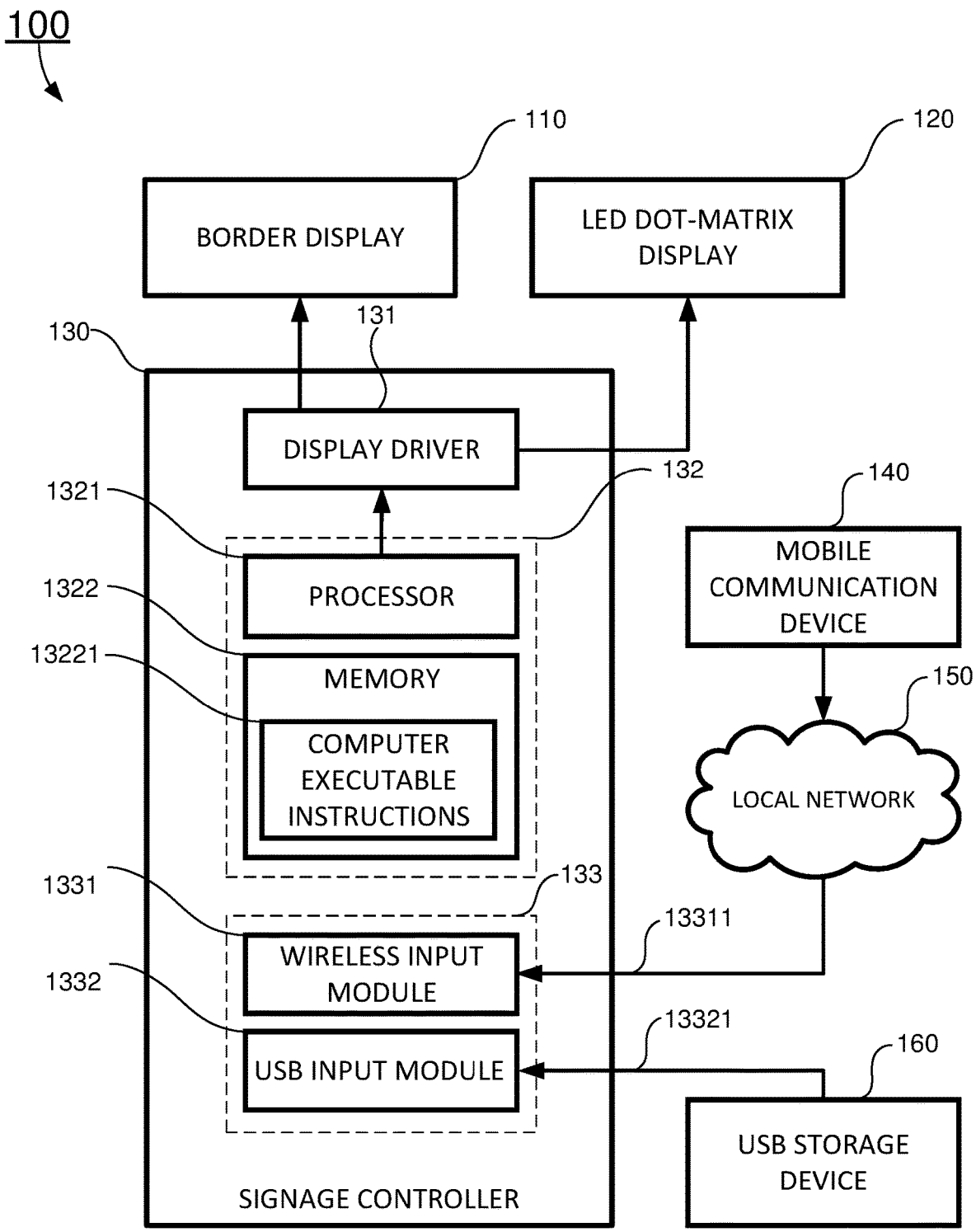
FIG. 1 shows a block diagram of a ride share signage device according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

The description will be made as to the embodiments of the present disclosure in conjunction with the accompanying drawings FIGS. 1 through 7.

Referring now to FIG. 1, in one aspect, the present disclosure relates to a ride share signage device 10. In certain embodiments, the ride share signage device 10 includes: a border display element 110, a light emitting diode (LED) dot-matrix display element 120, and a signage controller 130.

Figure 2:
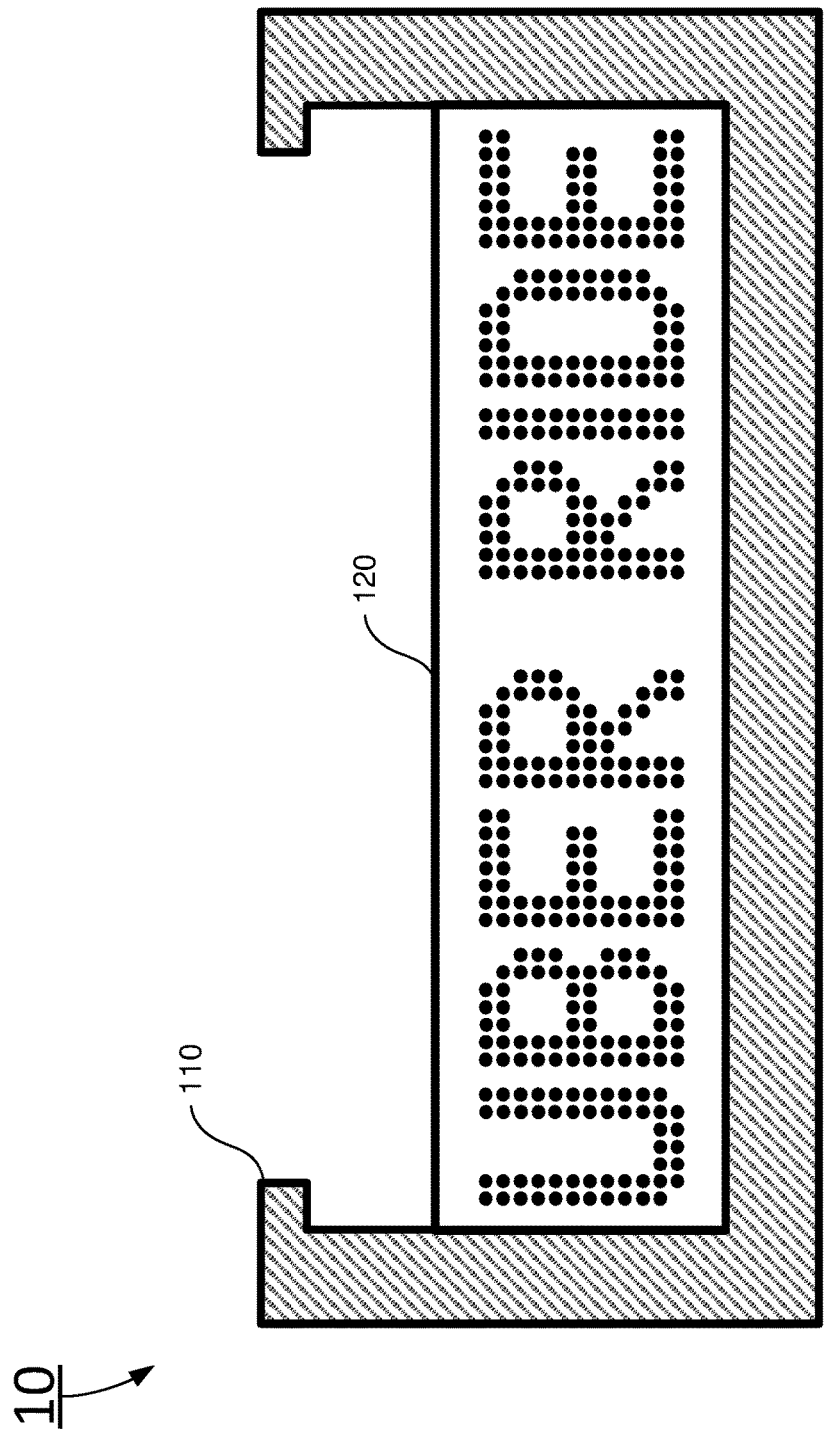
FIG. 2 is an exemplary advertisement message for Uber showing on the ride share signage device according to certain embodiments of the present disclosure.
Figure 3:
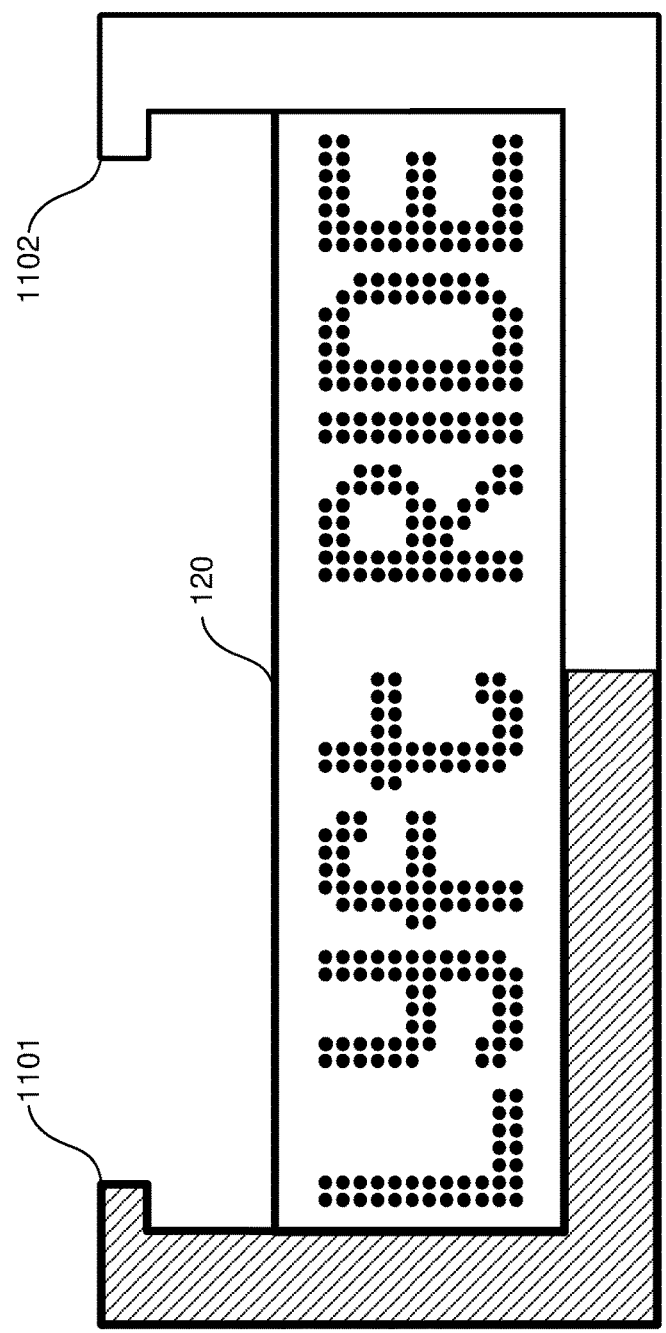
FIG. 3 is an exemplary advertisement message for Lyft showing on the ride share signage device according to certain embodiments of the present disclosure.

In certain embodiments, the border display element 110 is used to display initials of ride share companies. In one embodiment, as shown in FIG. 2, the border display element 110 forms a letter "U" shaped outside border. When the border display element 110 is turn on, the border display element 110 shows the letter "U" for Uber. In another embodiment, as shown in FIG. 3, the border display element 110 includes a first border display portion 1101 for displaying the letter "L" when the first border display portion 1101 is turned on, as shown in FIG. 3, and a second border display portion 1102 for displaying a second half of the letter "U" when the first border display portion 1101 and the second border display portion 1102 are both turned on, as shown in FIG. 2. In certain embodiments, when the driver of the vehicle works for both Uber and Lyft, the letter "U" and the letter "L" may be displayed alternatively and in different colors.

Figure 4:
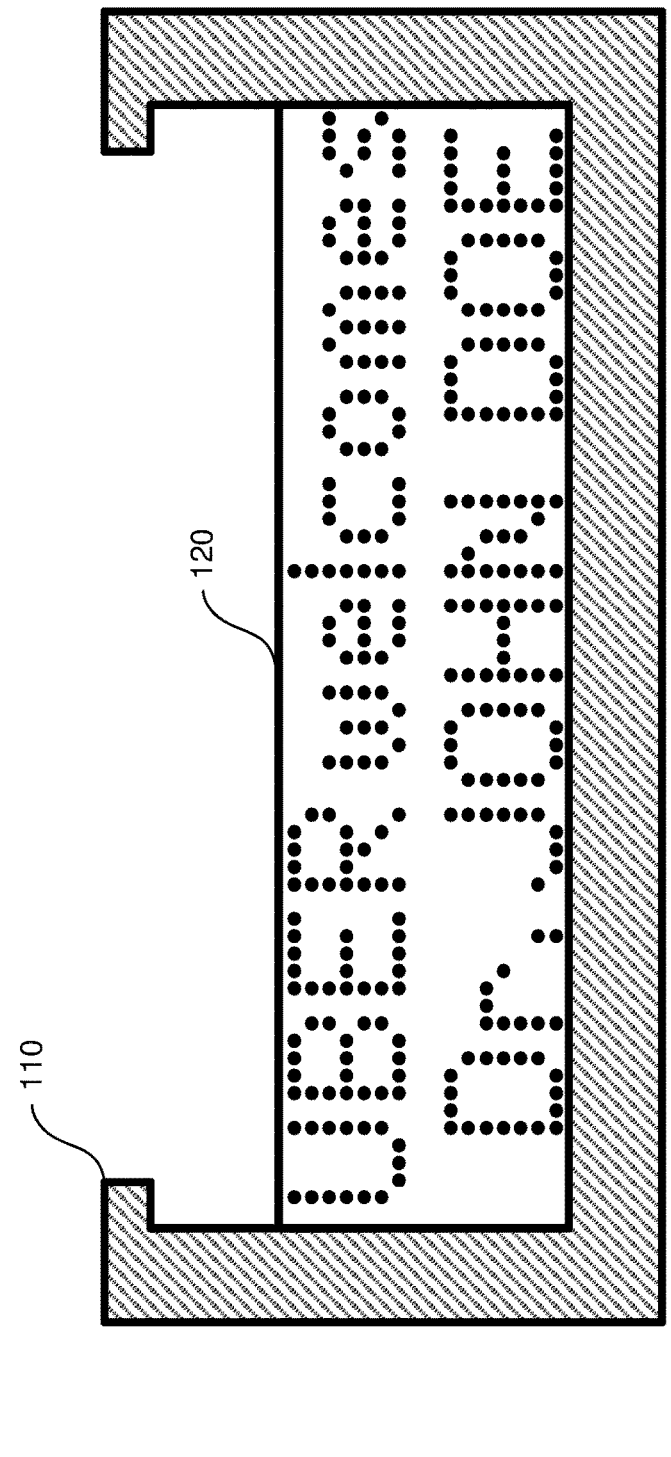
FIG. 4 is an exemplary rider information message for Uber showing on the ride share signage device according to certain embodiments of the present disclosure.
Figure 5:
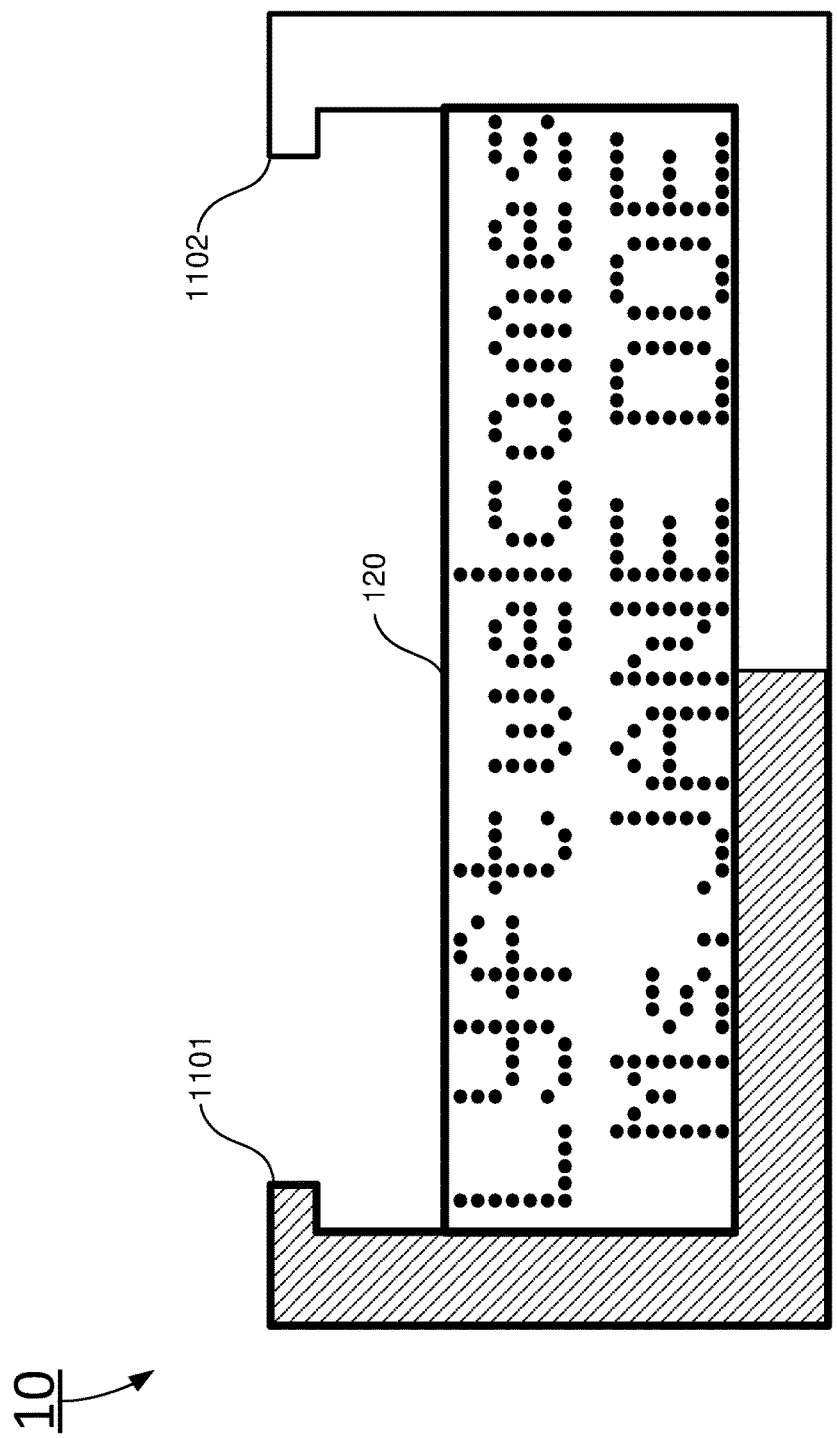
FIG. 5 is an exemplary rider information message for Lyft showing on the ride share signage device according to certain embodiments of the present disclosure.

In certain embodiments, the LED dot-matrix display element 120 is used to display a short message. In certain embodiments, the short message includes one or more advertisement messages and rider welcome messages in different languages. In one embodiment, the LED dot-matrix display element 120 displays an exemplary advertisement for Uber as shown in FIG. 2, and an exemplary advertisement for Lyft as shown in FIG. 3. In another embodiment, the LED dot-matrix display element 120 displays an exemplary rider welcome message "Uber welcomes Dr. John Doe" as shown in FIG. 4, and another exemplary rider welcome message "Lyft welcomes Ms. Jane Doe" as shown in FIG. 5. In certain embodiments, the first name and the last name initial may be displayed for the rider and/or the driver for privacy reason. For example, one rider welcome message may recite: "Uber welcomes Mr. Stephen D.". Another rider welcome message may recite: "Lyft welcomes Ms. Rebecca M.".

Figure 6:
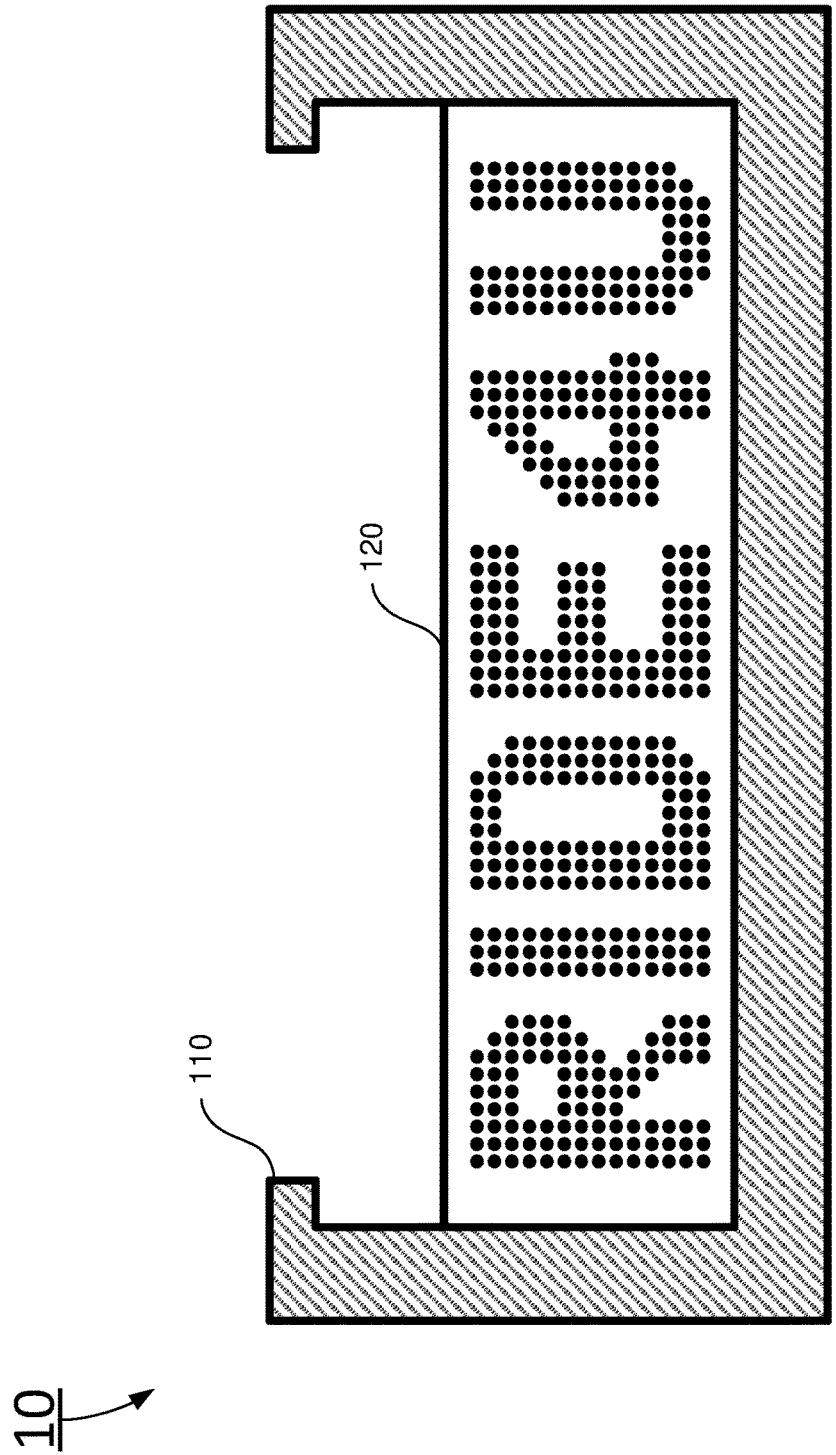
FIG. 6 shows an exemplary license tag of the driver for Uber on the ride share signage device according to certain embodiments of the present disclosure.

In certain embodiments, the rider welcome message includes a short message designated by the rider, the driver, or both the rider and the driver. The short message includes one or more of: the rider's name, the rider's phone number, the driver's name, the driver's phone number, a driver's license tag, the pick-up location, the drop-off location, or any other ride related information. Each of these short messages may be displayed in sequence and in different colors. When the driver and/or the rider choose not to use their names, the short message may include a phrase designated by the driver and/or the rider. In one embodiment, as shown in FIG. 6, the short message is a phrase: "RIDE4U". This phrase may also be a driver's license tag. As long as the rider is aware of this phrase, the short message will assist the rider to identify the driver. When one or more short messages are displayed in the LED dot-matrix display element 120 and they don't fit on one screen, the one or more short messages may be displayed in multiple screens. The multiple screen short messages may be displayed in a rolling manner: rolling from left to right, from right to left, from bottom to top, and from top to bottom. Other transition effects may be used to transit from one short message to another.

In certain embodiments, the signage controller 130 includes a display driver 131 to manage displays on the border display element 110 and the LED dot-matrix display element 120, respectively. The signage controller 130 also includes an input module 133 and a processing element 132. The input module 133 receives information about one or more riders through a ride request and the advertisement messages to be displayed on the LED dot-matrix display element 120.

In certain embodiments, the input module 133 includes a wireless input module 1331 and a USB input module 1332. The wireless input module 1331 receives the ride request and the advertisement messages 13311 through a local network 150 over a mobile communication device 140. The USB input module 1332 receives the advertisement messages 13321 through a USB storage device 160. The local network 150 may include a Wi-Fi network and a Bluetooth network. The mobile communication device 140 includes an internet enabled portable computing device and a smartphone.

In certain embodiments, the processing element 132 includes a processor 1321 and a non-volatile memory storing computer executable instructions. When executed by the processor 1321, the computer executable instructions cause the processor 1321 to:

turn on the ride share signage device 10 when a driver starts a vehicle and display one or more advertisement messages;

receive a rider's information through a ride request via the input module 133;

instruct the display driver 131 to display a border on the border display element 110 that is related to the rider share company, and one or more advertisement messages on the LED dot-matrix display element 120;

instruct the display driver 131 to display the rider welcome message in a predetermined distance before the vehicle reaches a pick-up location defined by the ride request;

instruct the display driver 131 to display the border on the border display element 110 and the advertisement messages on the LED dot-matrix display element 120 related to the ride share company after the riders have been picked-up; and instruct the display driver 131 to display the advertisement messages after the riders have been dropped-off.

In certain embodiments, the ride share signage device 10 may be mounted on a dashboard of the vehicle. In one embodiment, the ride share signage device 10 may be attached to the dashboard of the vehicle using Velcro strips. In another embodiment, the ride share signage device 10 may be attached to the dashboard through a bracket at the bottom of the ride share signage device 10. In yet another embodiment, the ride share signage device 10 may be attached to a windshield of the vehicle using one or more suction mounts. In another embodiment, the ride share signage device 10 may be mounted on the dashboard with the bracket and Velcro strips at the bottom, and attached to the windshield of the vehicle using one or more suction mounts on the top. In one embodiment, the ride share signage device 10 may be powered by electric power outlets in the vehicle. In another embodiment, the ride share signage device 10 may be powered by battery and/or rechargeable battery.

Figure 7:
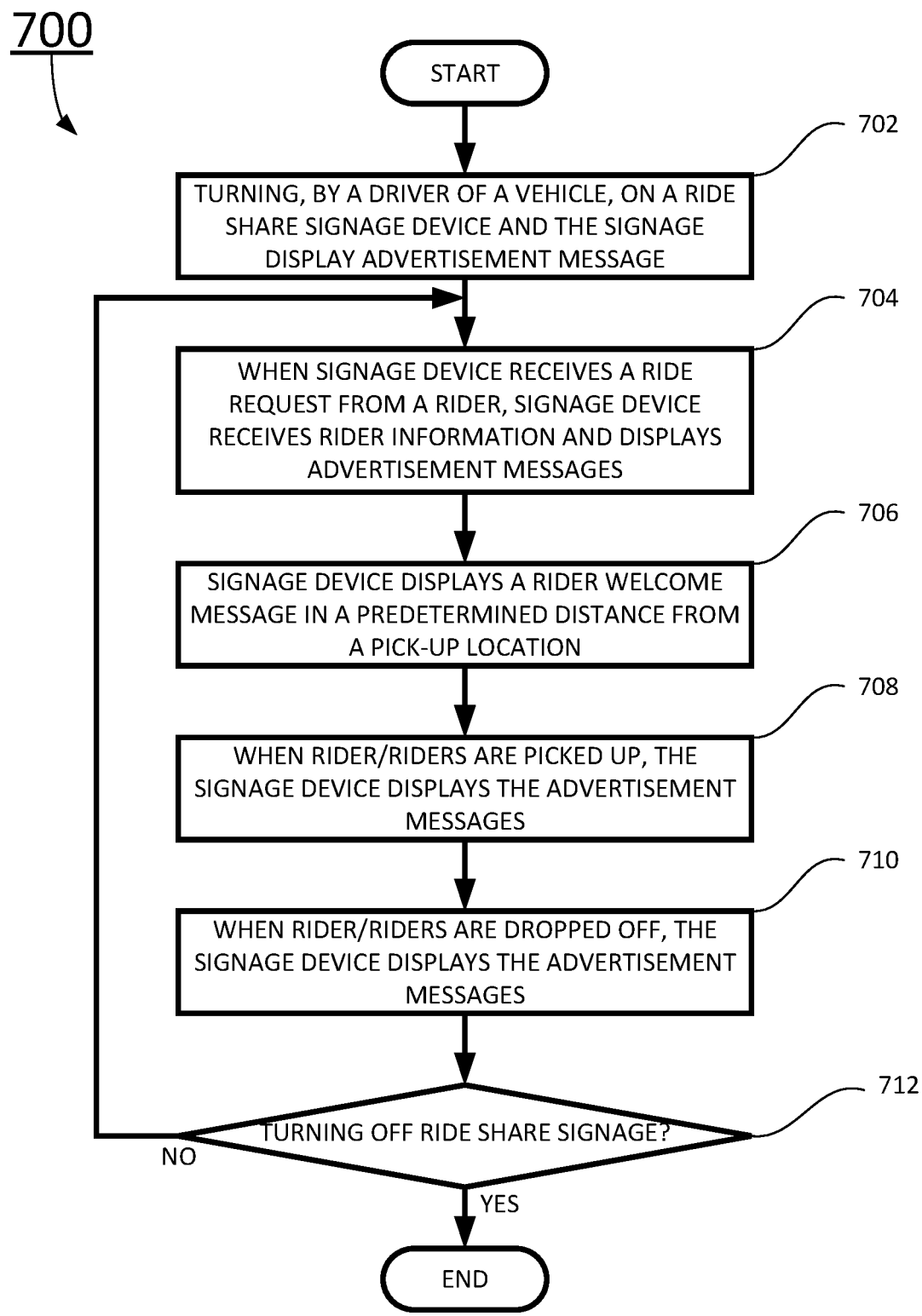
FIG. 7 shows a flow chart of a method of using the ride share signage device according to certain embodiments of the present disclosure.

Referring now to FIG. 7, in another aspect, the present disclosure relates to a method 700 of using a ride share signage device 10 according to certain embodiments of the present disclosure.

Prior to using the ride share signage device 10, a driver of a vehicle mounts the ride share signage device 10 on a dashboard of the vehicle. In one embodiment, the ride share signage device 10 may be attached to the dashboard of the vehicle using Velcro strips and/or a bracket at the bottom of the ride share signage device 10. In another embodiment, the ride share signage device 10 may be attached to a windshield of the vehicle using one or more suction mounts. In yet another embodiment, the ride share signage device 10 may be attached to the dashboard of the vehicle using Velcro strips with a bracket at the bottom of the ride share signage device 10 at the bottom and attached to a windshield of the vehicle using one or more suction mounts at the top.

At block 702, when the driver starts the vehicle and provides electrical power to the ride share signage device 10, the ride share signage device 10 may be turned on automatically, and the ride share signage device 10 displays one or more advertisement messages stored in a memory of the ride share signage device 10 or one or more advertisement messages 13321 retrieved from a USB storage device 160 through a USB input module 1332. In one embodiment, the ride share signage device 10 may be powered by electric power outlets in the vehicle to provide standard 12 volt direct current (DC) power source. In another embodiment, the ride share signage device 10 may be powered by battery and/or rechargeable battery.

At block 704, when the driver's mobile communication device accepts and receives a ride request, the ride share signage device 10 receives a rider's information through a ride request 13311 via an input module 133 of a signage controller 130. The rider's information may include a name, a phone number, a ride share company, a pick-up location, and a drop-off location. In certain embodiments, the ride share signage device 10 displays certain advertisement messages related to the ride share company. For example, a border display element 110 of the ride share signage device 10 displays a letter "U" for Uber, or a letter "L" for Lyft. When the driver works for both ride share companies, the letter "U" and "L" are displayed alternatively and in distinct colors. The border display element 110 includes a first border display portion 1101 for displaying the letter "L" when the first border display portion 1101 is turned on, and a second border display portion 1102 for displaying a second half of the letter "U" when the first border display portion 1101 and the second border display portion 1102 are both turned on, and the letter "U" and the letter "L" are in different colors. In addition to the ride share company related border display, an LED dot-matrix display element 120 of the ride share signage device 10 displays certain advertisement messages at the same time.

At block 706, when the ride share signage device 10 display a rider welcome message in a predetermined distance from the pick-up location. In one embodiment, when the vehicle is 200 yards away from the pick-up location, the LED dot-matrix display element 120 of the ride share signage device 10 displays a rider welcome message such as "Uber welcomes Dr. Davis" or "Lyft welcomes Ms. Anne G.". Other predefined short messages such as the rider's name, the rider's phone number, the driver's name, the driver's phone number, a driver's license tag, the pick-up location, and the drop-off location may also be displayed.

At block 708, when the rider or riders have been picked up, the ride share signage device 10 displays various advertisement messages. In one embodiment, if the current rider is going to airport, the short message may recite: "Going to airport, wave if you need a ride to airport". In another embodiment, the ride share signage device 10 displays the advertisement messages on the LED dot-matrix display element 120 related to the ride share company.

At block 710, when the rider or riders have been dropped off at the drop-off location, the ride share signage device 10 displays various other advertisement messages.

At query block 712, when the driver stops the vehicle, the ride share signage device 10 may be turned off. Otherwise, the method continues to block 704, where the ride share signage device 10 displays various advertisement messages and waits for next ride request.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims, the foregoing description and the exemplary embodiments described therein, and accompanying drawings.

What is claimed is:

1. A rideshare signage device, comprising:
a border display element positioned on a dash board of a vehicle for displaying initials of rideshare companies, wherein the border display element is formed around a light emitting diode (LED) dot-matrix display element and the border display element comprises an "L" shaped first border display portion for displaying a letter "L" symbolizing a first rideshare service, and a mirror "L" shaped second border display portion to be combined with the first border display portion for displaying a letter "U" symbolizing a second rideshare service when the first border display portion and the second border display portion are combined and turned on simultaneously, and when a driver works for both rideshare companies, the letter "U" and the letter "L" are displayed alternatively and in distinct colors;
the light emitting diode (LED) dot-matrix display element for displaying a plurality of advertisement messages and rider welcome messages in a plurality of languages; and
a signage controller having a display driver to manage displays on the border display element and the LED dot-matrix display element, respectively, an input module to receive information about one or more riders through a ride request and the plurality of advertisement messages, and a processing element, wherein the processing element comprises a processor and a non-volatile memory storing computer executable instructions, when executed by the processor, the computer executable instructions cause the processor to:
turn on the rideshare signage device when a driver starts a vehicle and display the plurality of advertisement messages;

receive a rider's information through the ride request via the input module, wherein the rider's information comprises a name, a phone number, a rideshare company, a pick-up location, and a drop-off location;

instruct the display driver to display a border on the border display element and the plurality of advertisement messages on the LED dot-matrix display element;

instruct the display driver to display the rider welcome message in a predetermined distance before the vehicle reaches the pick-up location;

instruct the display driver to display the border on the border display element and the advertisement messages on the LED dot-matrix display element related to the rideshare company after the riders have been picked-up; and instruct the display driver to display the plurality of advertisement messages after the riders have been dropped-off.

2. The rideshare signage device of claim 1, wherein the first border display portion of the border display element is in a first color for displaying the letter "L", and when the first border display portion and the second border display portion of the border display element are combined for displaying the letter "U", the combination of the first border display portion and the second border display portion of the border display element is in a second color.

3. The rideshare signage device of claim 1, wherein the rider welcome message comprises a short message designated by the rider, the driver, or both the rider and the driver.

4. The rideshare signage device of claim 3, wherein the short message comprises one or more of: the rider's name, the rider's phone number, the driver's name, the driver's phone number, a driver's license tag, the pick-up location, and the drop-off location, each having a different color.

5. The rideshare signage device of claim 4, wherein the first name and the last name initial may be displayed for the rider and/or the driver for privacy reason.

6. The rideshare signage device of claim 5, wherein the short message comprises a phrase designated by the driver and/or the rider, when the driver and/or the rider choose not to use their names.

7. The rideshare signage device of claim 6, wherein when one or more short messages do not fit on one screen, the one or more short messages may be displayed in multiple screens.

8. The rideshare signage device of claim 7, wherein the multiple screen short message may be displayed in a rolling manner: rolling from left to right, from right to left, from bottom to top, and from top to bottom.

9. The rideshare signage device of claim 1, wherein the input module comprises a wireless input module for receiving the ride request and the plurality of advertisement messages through a local network over a mobile communication device, and a USB input module for receiving the plurality of advertisement messages through a USB storage device.

10. The rideshare signage device of claim 9, wherein the local network comprises a Wi-Fi network and a Bluetooth network, and the mobile communication device comprises an internet enabled portable computing device or a smartphone.

11. The rideshare signage device of claim 1, wherein the rideshare signage device is mounted on a dashboard of the vehicle.

12. The rideshare signage device of claim 11, wherein the rideshare signage device is attached to the dashboard of the vehicle using hook and loop fastening strips and/or a bracket at the bottom of the rideshare signage device, and attached to a windshield of the vehicle using one or more suction mounts, and the rideshare signage device may be powered by electric power outlets in the vehicle, and/or by battery and/or rechargeable battery.

13. A method of using a rideshare signage device, comprising:

mounting, by a driver of a vehicle, the rideshare signage device on a dashboard of the vehicle;

turning on the rideshare signage device when the driver starts the vehicle and provides electrical power to the rideshare signage device to display a plurality of advertisement messages;

displaying one or more letters, by a border display element formed around a light emitting diode (LED) dot-matrix display element and the border display element comprises an "L" shaped first border display portion for displaying a letter "L", and a mirror "L" shaped second border display portion to be combined with the first border display portion for displaying a letter "U", the letter "U" being displayed in response to a first indication that the driver works for a first ride-share service, the letter "L" being displayed in response to a second indication that the driver works for a second ride-share service, and in response to a third indication that the driver works for both the first and the second rideshare companies, the letter "U" and the letter "L" are displayed alternatively and in distinct colors;

receiving, by the rideshare signage device, a rider's information via an input module of a signage controller, when the driver's mobile communication device accepts and receives a ride request, wherein the rider's information comprises a name, a phone number, a rideshare company, a pick-up location, and a drop-off location;

displaying a border on a border display element and the plurality of advertisement messages on a light emitting diode (LED) the LED dot-matrix display element related to the rideshare company;

displaying a rider welcome message in a predetermined distance before the vehicle reaches the pick-up location;

displaying the border on the border display element and the plurality of advertisement messages on the LED dot-matrix display element related to the rideshare company after the riders have been picked-up; and displaying the plurality of advertisement messages after the riders have been dropped-off.

14. The method of claim 13, wherein the border display element displays an initial of the rideshare company;

the LED dot-matrix display element displays the plurality of advertisement messages and the rider welcome message in a plurality of languages; and a display driver of the signage controller manages displays on the border display element and the LED dot-matrix display element, respectively, an input module of the signage controller receives information about one or more riders through the ride request and the plurality of advertisement messages, and a processor and a non-volatile memory of the signage controller stores computer executable instructions, when executed by the processor, the computer executable instructions cause the processor to control the rideshare signage device and manage the displays.

15. The method of claim 13, wherein the mounting comprises mounting the rideshare signage device on the dashboard of the vehicle using hook and loop fastening strips and/or the bracket at the bottom of the rideshare signage device, and/or mounting the rideshare signage device to a windshield of the vehicle using one or more suction mounts, and optionally powering the rideshare signage device by electric power outlets in the vehicle, and/or by battery and/or rechargeable battery.

16. The method of claim 13, wherein the rider welcome information comprises a short message designated by the rider, the driver, or both the rider and the driver, and the short message comprises one or more of: the rider's name, the rider's phone number, the driver's name, the driver's phone number, a driver's license tag, the pick-up location, and the drop-off location, each having a different color.

17. The method of claim 13, wherein when one or more short messages do not fit on one screen, the one or more short messages may be displayed in multiple screens, and the multiple screen short messages may be displayed in a rolling mannerrolling from left to right, from right to left, from bottom to top, and from top to bottom.

18. The method of claim 13, wherein the input module comprises a wireless input module for receiving ride request and the plurality of advertisement messages through a local network over a mobile communication device, and a USB input module for receiving the plurality of advertisement messages through a USB storage device, wherein the local network comprises a Wi-Fi network and a Bluetooth network, and the mobile communication device comprises an internet enabled portable computing device or a smartphone.

* * * * *